United States Patent

[11] 3,571,866

[72] Inventor John J. Brown, Jr.
        Siler City, N.C.
[21] Appl. No. 816,243
[22] Filed Apr. 15, 1969
[45] Patented Mar. 23, 1971
[73] Assignee Forrest Paschal Machinery Company
        Siler City, N.C.

[54] SYSTEM FOR AUTOMATICALLY HANDLING SETTERS FILLED WITH CERAMIC TILE
15 Claims, 15 Drawing Figs.

[52] U.S. Cl. .................................................. 25/2,
                                          198/19, 214/6A,
[51] Int. Cl. ..................................................... B28b 15/00
                                          B65g 45/52, B65g 60/00
[50] Field of Search ........................................ 25/2;
                                          198/19, 85; 214/6, (Inquired)

[56] References Cited
UNITED STATES PATENTS
3,412,439  11/1968  Baker ............................ 25/1
3,474,917  10/1969  Pearne et al. ................. 25/2X
3,517,831  6/1970  Hahn ............................ 214/6

Primary Examiner—Robert D. Baldwin
Attorney—Hunt, Heard & Rhodes

ABSTRACT: The present invention is directed to a system for continuously processing unfired, glazed or green ceramic tile during the curing thereof. More specifically, the system automatically handles setters containing the tiles and according to the present invention comprises a loading station where freshly painted ceramic tiles are loaded into setters or saggers, a loading conveyor upon which the loaded setters originally embark, a load/unload transfer carriage which simultaneously transfers a course of setters loaded with green tiles from the conveyor onto a first, empty kiln car for transportation to a kiln and a course of setters loaded with fired tiles from a second, loaded kiln car back onto said conveyor, a flipover device which tilts the setters to a horizontal position, whereupon the tiles slide out by gravity, and a setter-turning device which returns the setters to their original upright position on the conveyor belt. The aforementioned elements are integrated into a closed loop system operated by a series of limit switches and photoelectric cells.

PATENTED MAR 23 1971

3,571,866

INVENTOR.
JOHN J. BROWN JR.
BY
Hunt & Rhodes

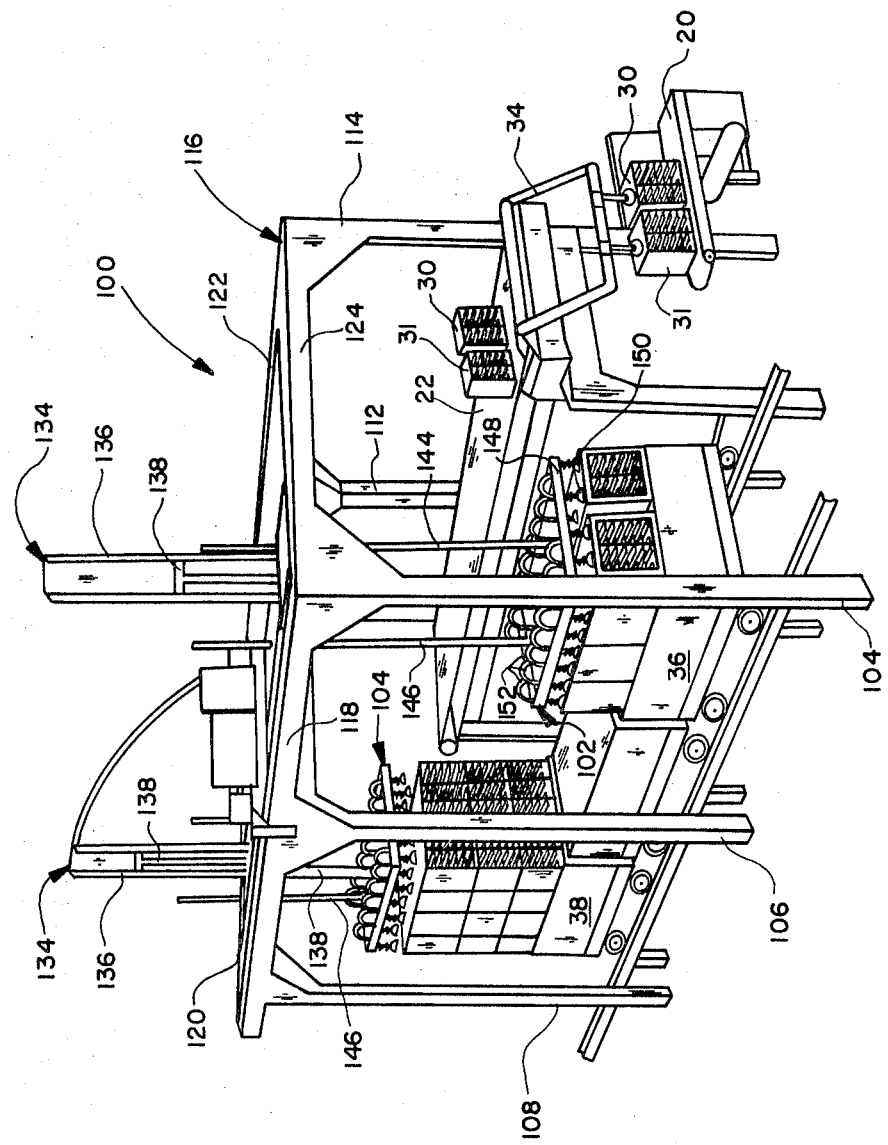

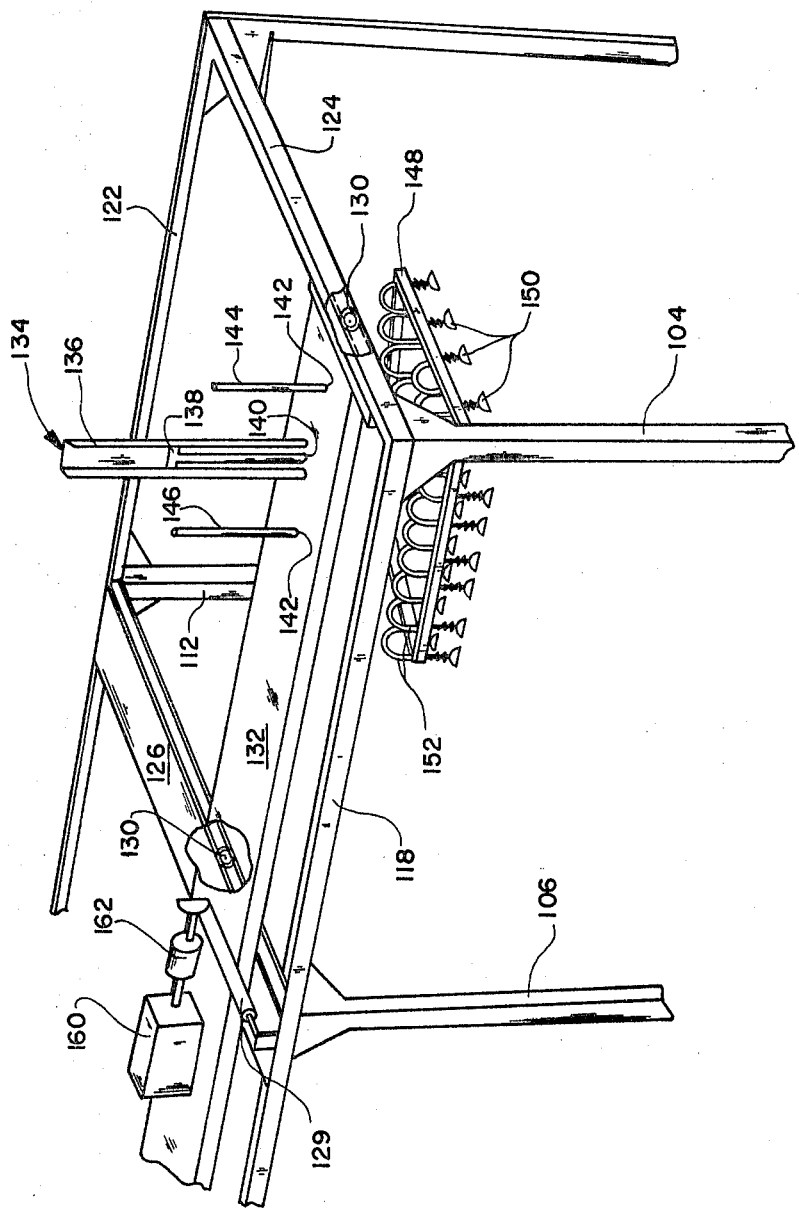

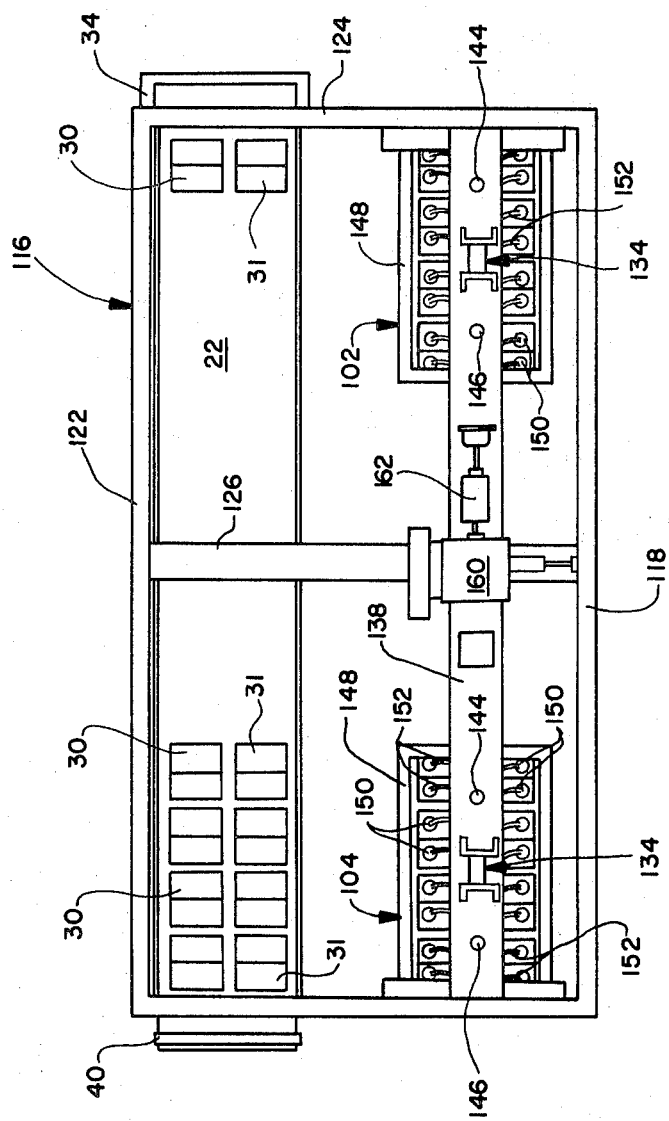

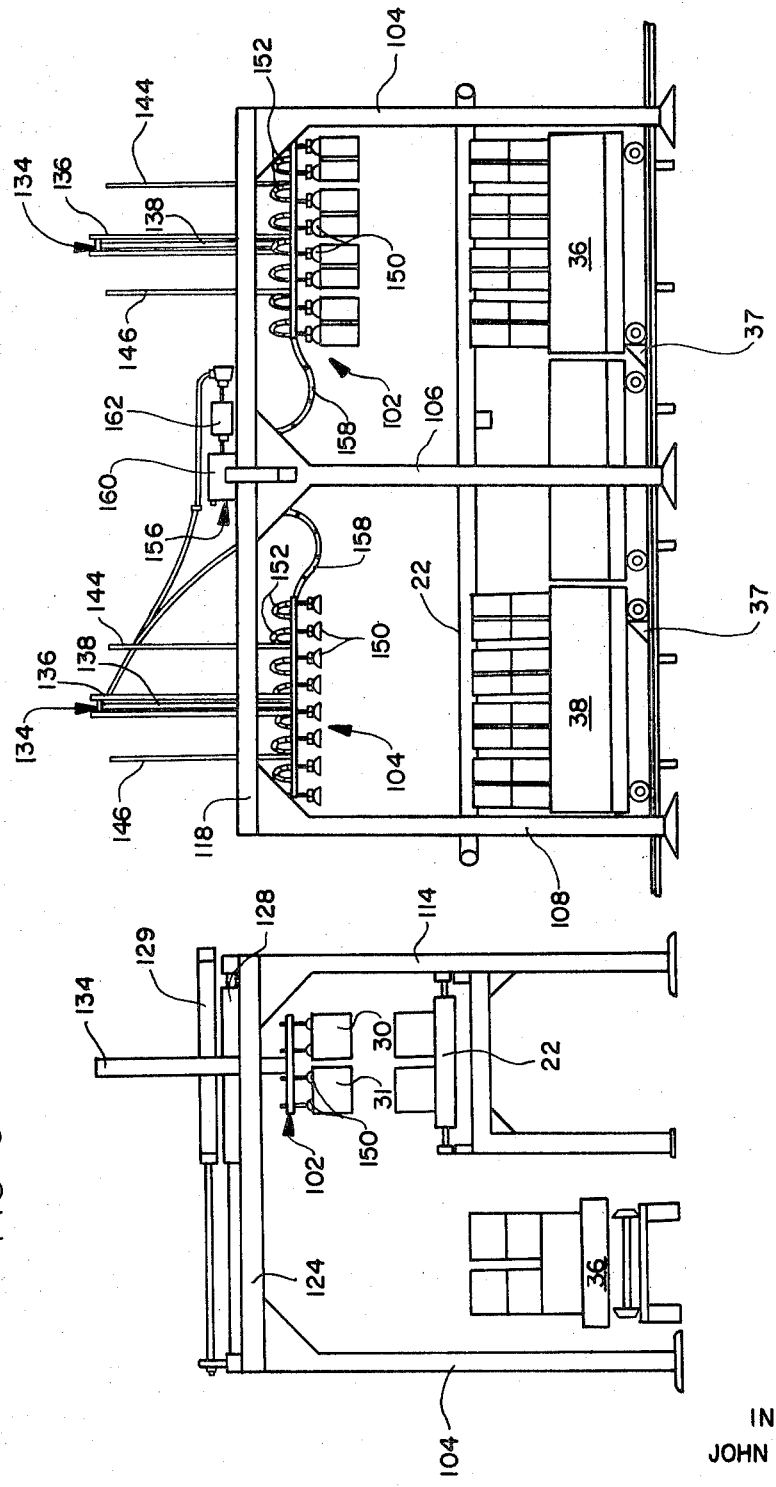

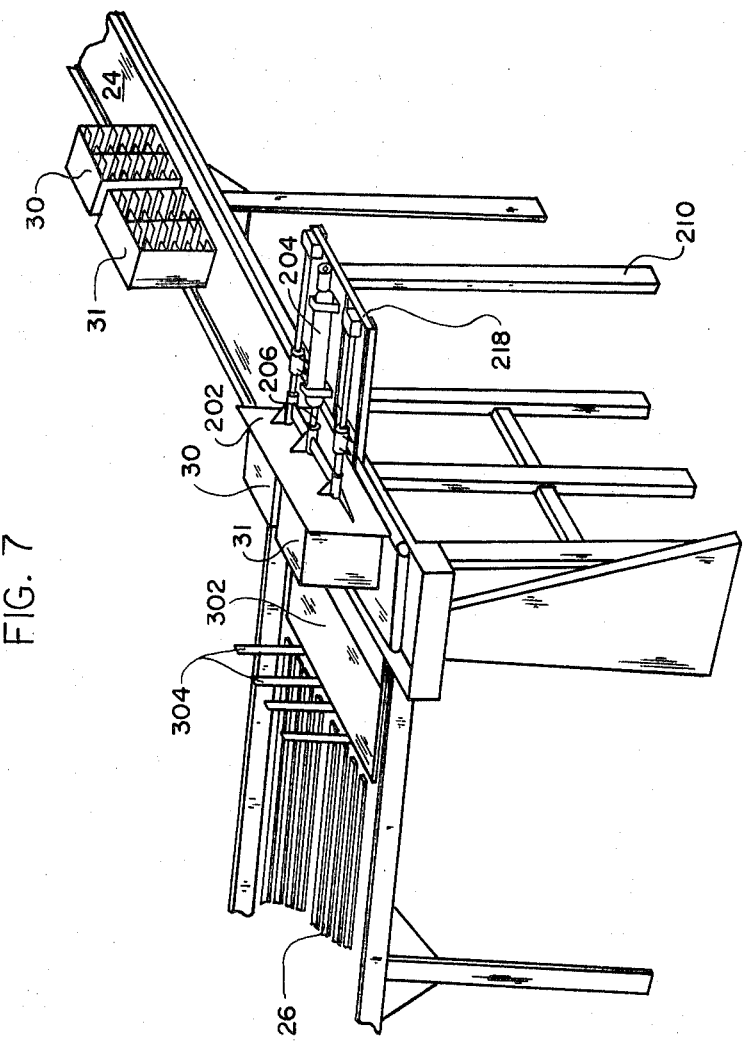

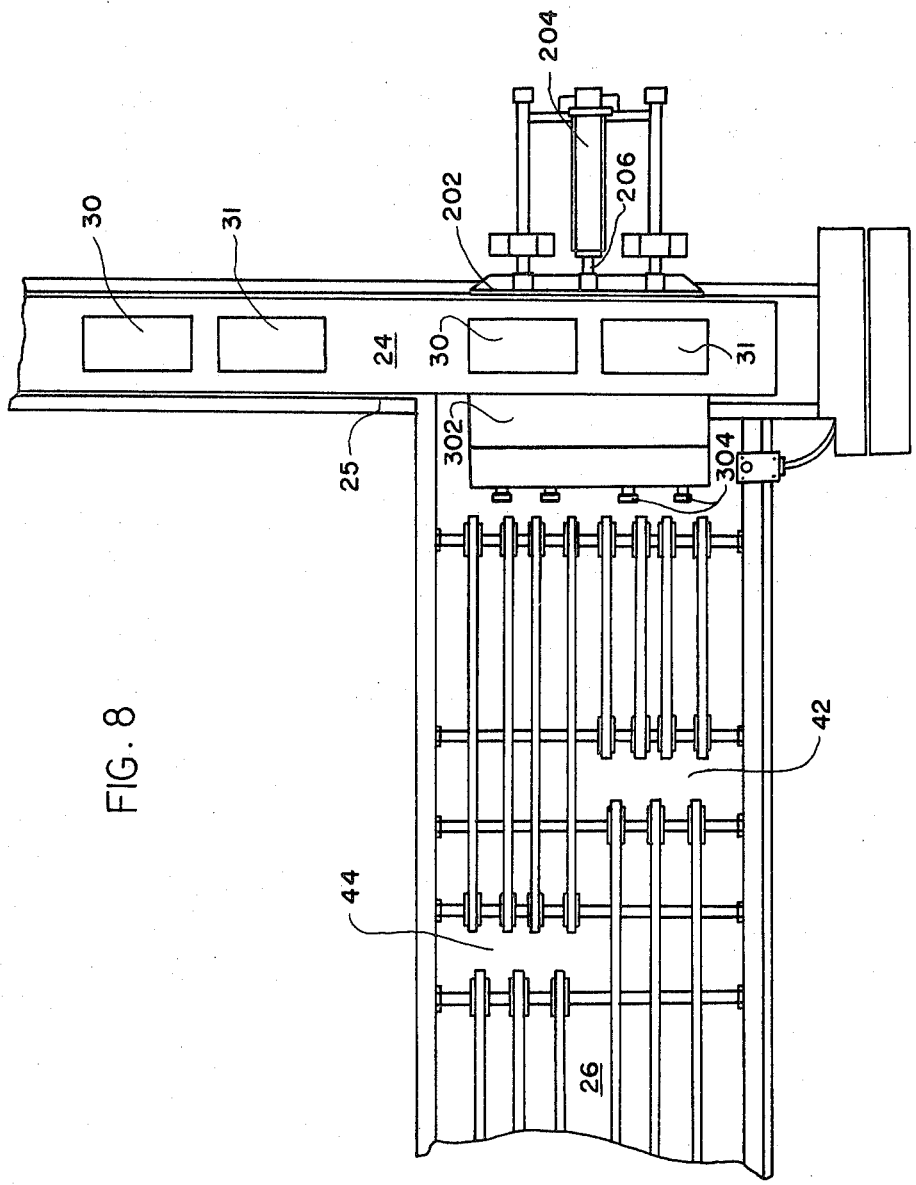

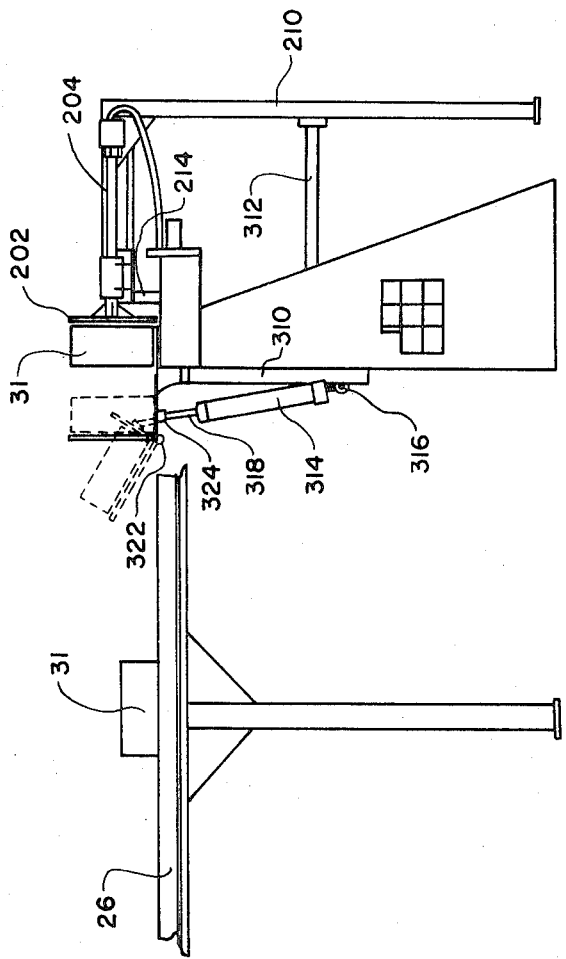

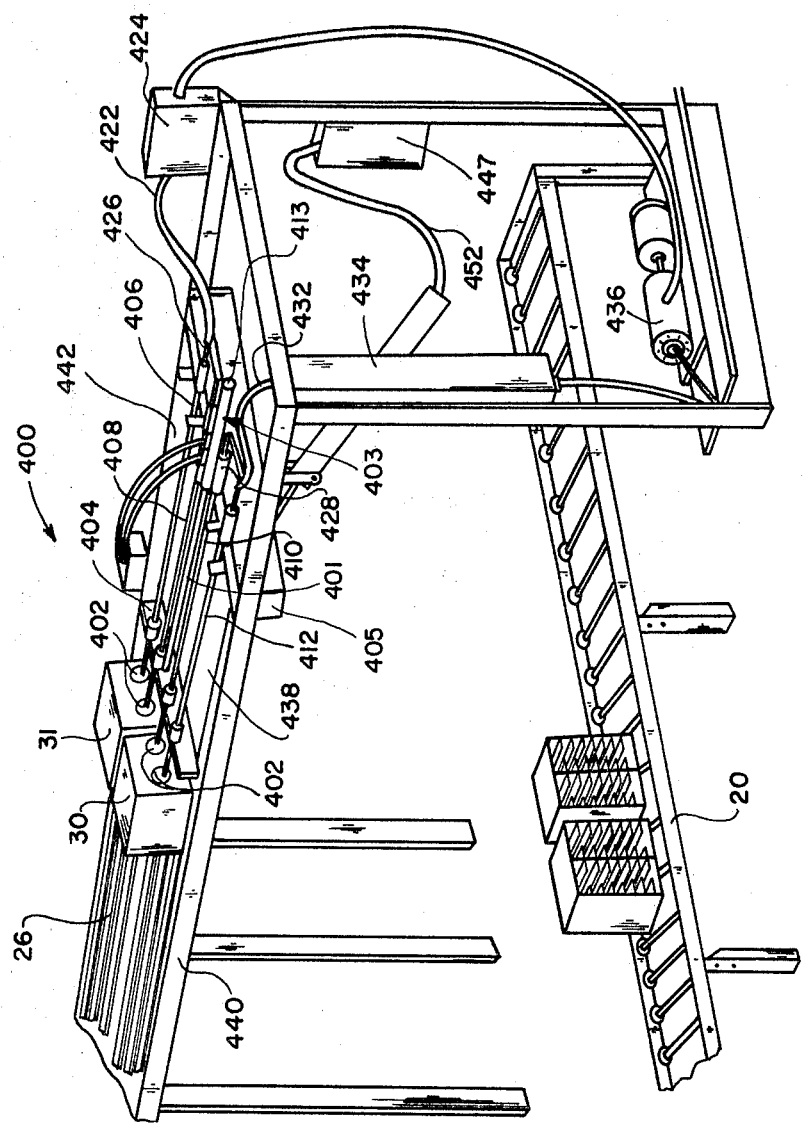

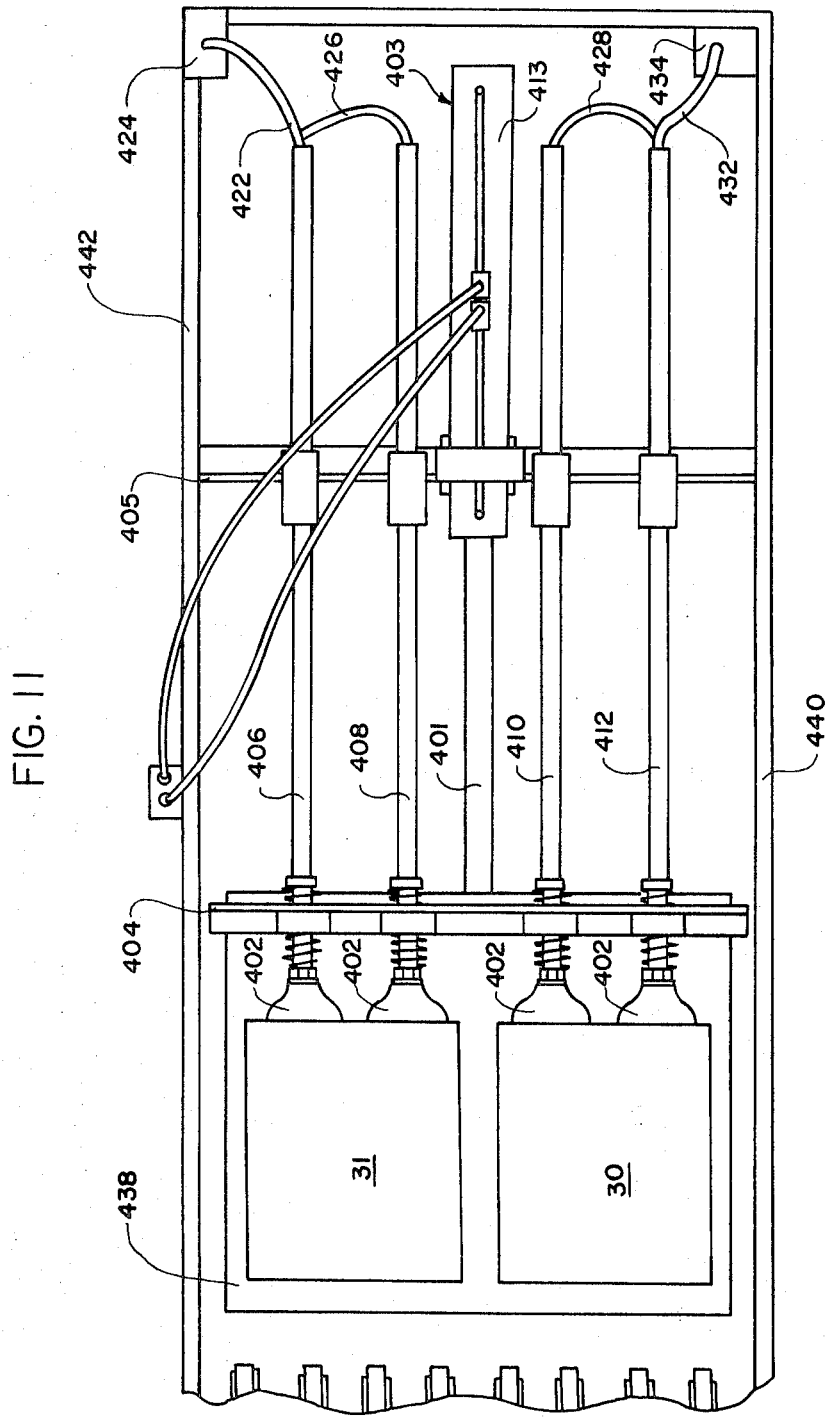

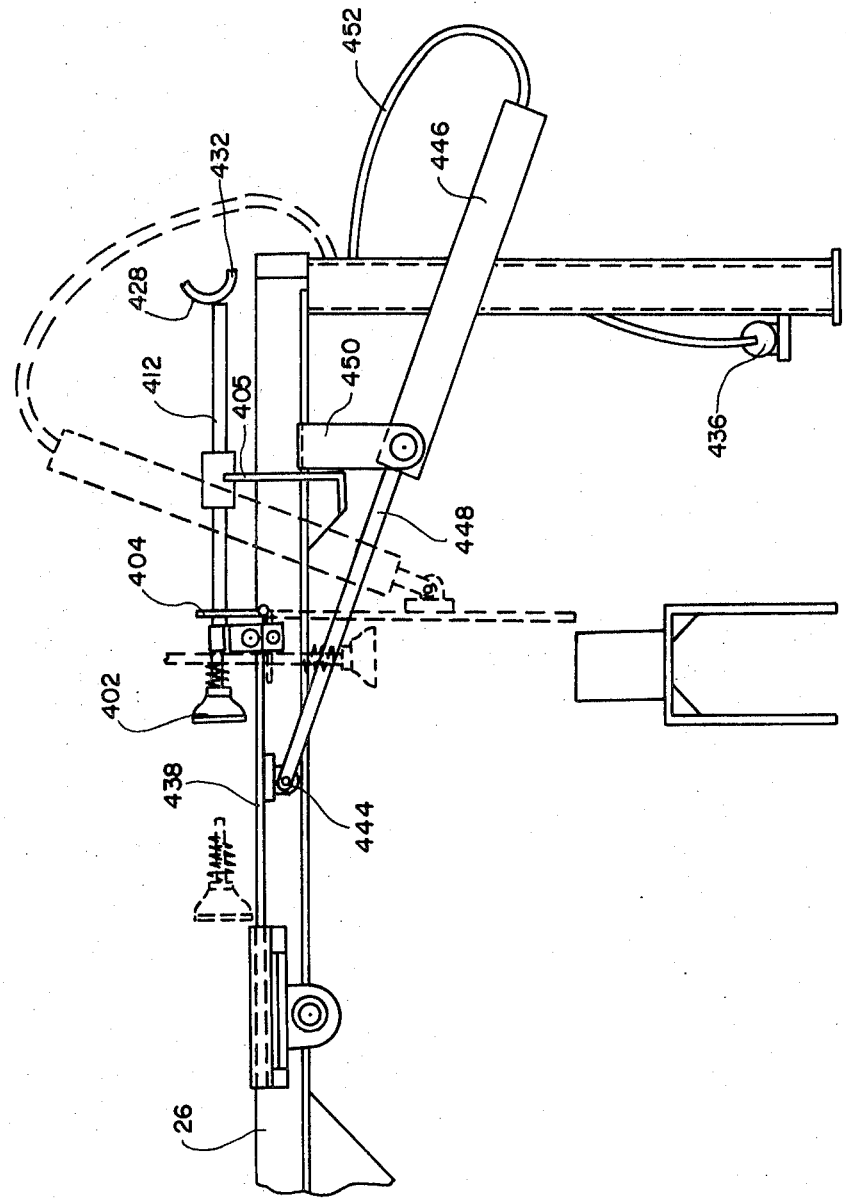

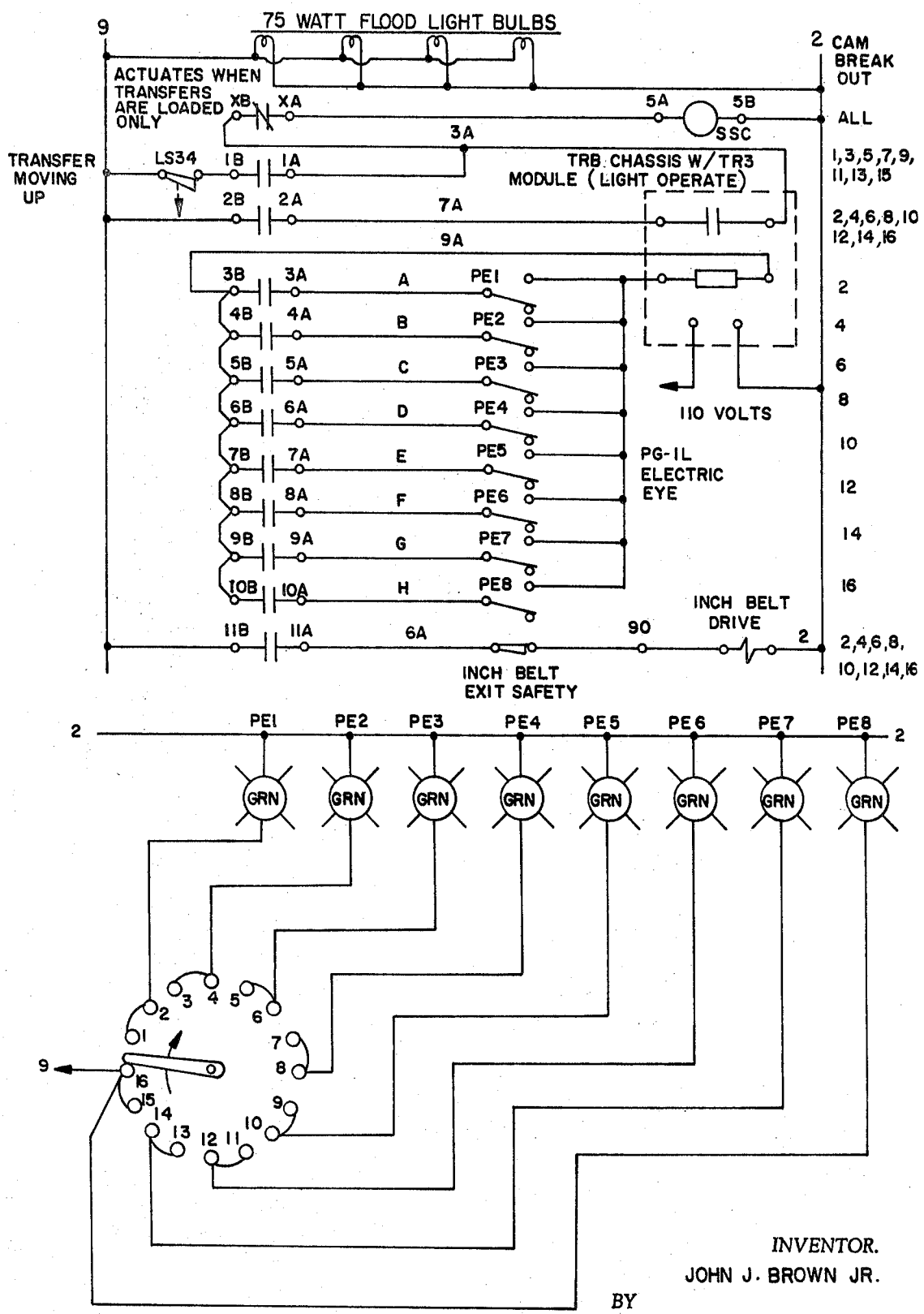
PILOT LIGHT CIRCUIT    FIG. 13

INVENTOR.
JOHN J. BROWN JR.
BY

INVENTOR.
JOHN J. BROWN JR.
BY

CO- CARRIAGE OVER

SYSTEM FOR AUTOMATICALLY HANDLING SETTERS FILLED WITH CERAMIC TILE

SUMMARY OF THE INVENTION

The present invention comprises preferably a closed, rectangular, conveyor loop, one side of the loop being at a lower elevation than the other three sides. The lower conveyor, called the loading index conveyor, presents a single file of empty setters or saggers, which move into position adjacent one of two tile-loading machines positioned adjacent the loading index belt. The loaded setters are then carried to one end of the loading index conveyor where they are transferred onto the second side of the conveyor loop called the inching conveyor.

A transfer device lifts the setters two at a time from the loading index conveyor up onto the inching conveyor which is at a higher elevation, whereupon the setters proceed to a loading area. When a course or layer is formed in the loading area, a first pickup head on a load/unload transfer carriage lifts the setters and transfers them to a kiln car which has been moved to a position adjacent the loading area of said inching conveyor. As the first pickup head releases the setters containing the green tiles, a second pickup head at the other end of the transfer carriage lifts a course or layer of setters containing fired tiles from a kiln car which has returned from the kiln and transfers it back to an unloading area on the inching conveyor with the return movement of the transfer carriage. This cycle is repeated until a prescribed number of layers or courses of setters are deposited upon the empty kiln car and the same number of courses are removed from the loaded kiln car returning from the kiln.

The setters containing cured tiles are then transferred to the third side of the conveyor loop called an unloading index conveyor. The setters proceed along the unloading index belt to the other end whereupon a hydraulically operated setter pusher pushes a pair of setters over onto a flipover device. The flipover device then turns the two setters 90° into a facedown position on the fourth side of the conveyor loop called a V-belt conveyor.

As the setters pass over a gap or slot in the V-belt conveyor, the tiles drop from their respective slots in the setter into a suitable receptacle. The setters then proceed down the V-belt conveyor to a cleaning station and on to the end of the V-belt conveyor.

Another transfer device called an empty setter puller/turner comprises a series of horizontally disposed suction heads which grasp the setters, pull them onto a hinged plate, whereupon they are rotated 90° to an upright position on the first side of the conveyor loop whereupon they return to be reloaded.

It is therefore an object of this invention to provide a system for automatically handling setters filled with green ceramic tiles around a closed loop conveyor whereby the setters are filled, loaded onto and unloaded from kiln cars, emptied, cleaned, and returned to their original loading position.

It is another object of this invention to provide a closed loop system of the type described wherein setters filed with green ceramic tiles are transported to a kiln and returned more quickly and efficiently than has heretofore been achieved.

It is still a further object of this invention to provide a closed loop system of the type described wherein setters filled with green ceramic tiles are delivered to a kiln and returned quickly and efficiently, yet with the care and delicacy required to eliminate breakage of the tiles.

It is yet another and more specific object of the invention to provide a closed loop system of the type described that includes a setter loader, a load/unload transfer carriage, a flipover device for emptying the setters, a resetting device for returning the setters to an upright position, and a series of conveyors connecting such devices.

Further objects and advantages within the scope of this invention such as relate to arrangement, operation and function of the related elements of the structure, and various details of the construction will be apparent from a consideration of the specification and drawings of the illustrated embodiment of the invention.

The operation of the machine and objects of the invention may be better understood in connection with a complete description which will be given in connection with the drawings wherein:

FIG. 2 is a perspective view of the load/unload transfer carriage with the remainder of the system broken away;

FIG. 3 is an enlarged perspective view illustrating the carriage upon which the pickup heads are mounted;

FIG. 4 is a plan view of the load/unload transfer carriage illustrated in FIG. 2;

FIG. 5 is an elevation view of the transfer carriage illustrated in FIG. 2;

FIG. 6 is an end view of the transfer carriage illustrated in FIG. 2;

Figure 1:
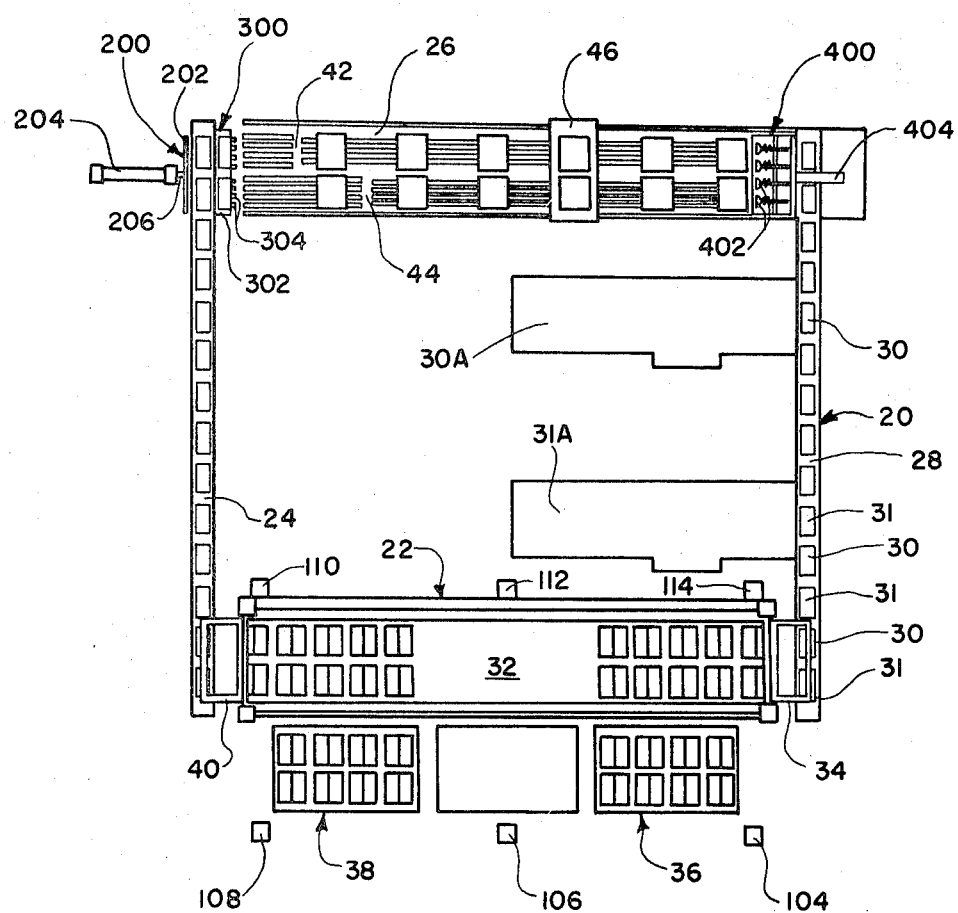
FIG. 1 is a plan view of the system for handling setters filled with green ceramic tiles according to the present invention.
Figure 14A:
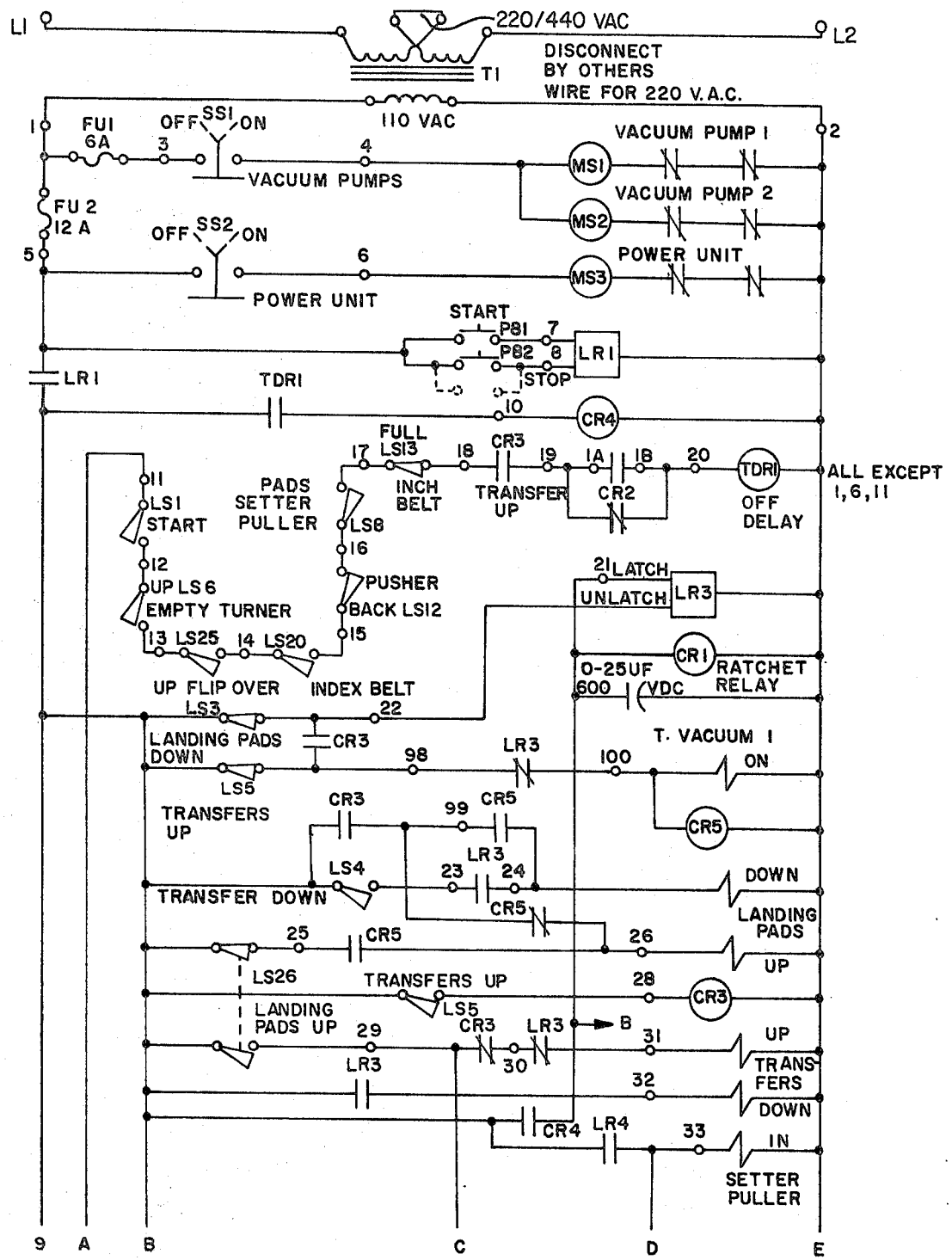
Figure 14B:
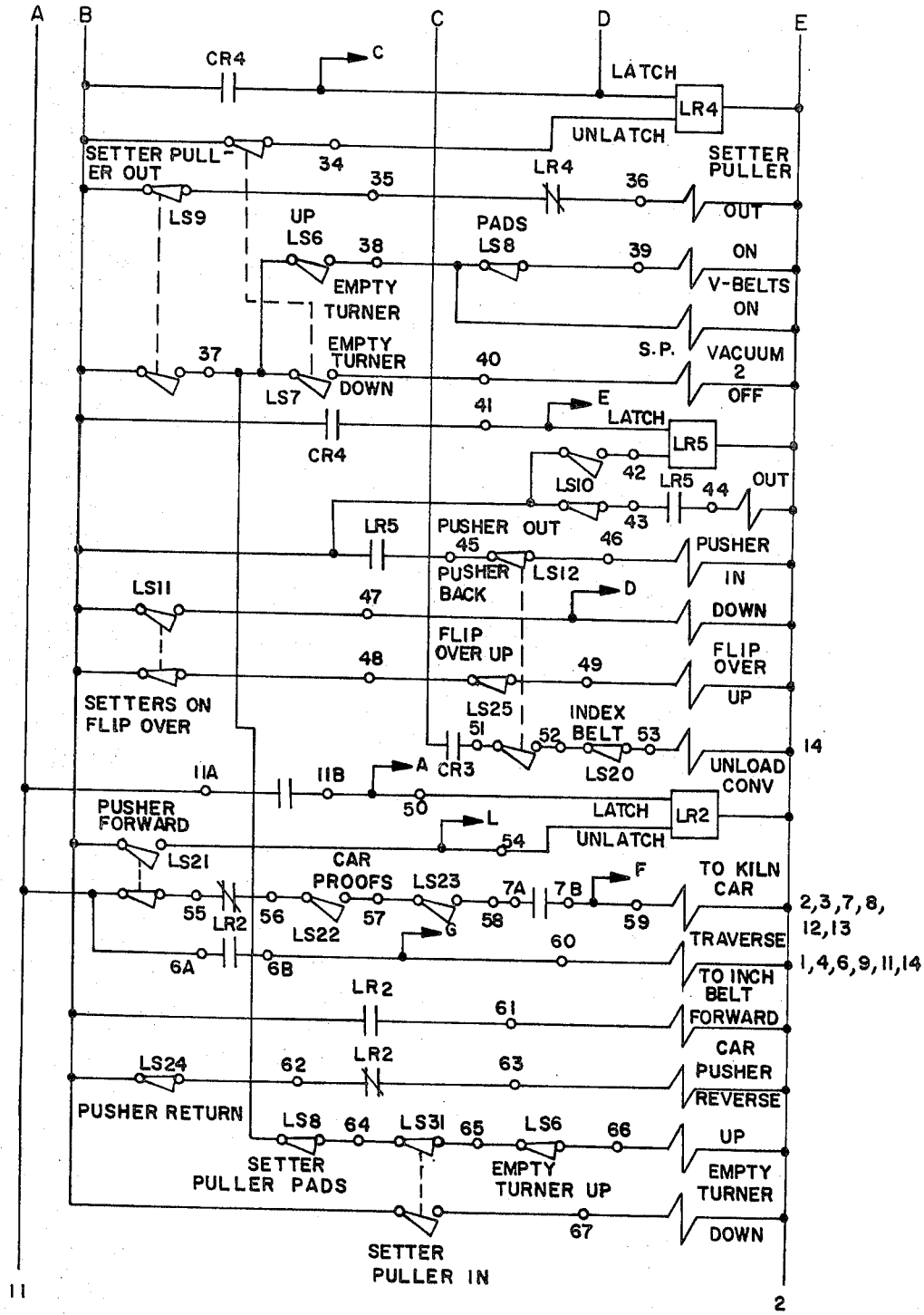
Figure 15:
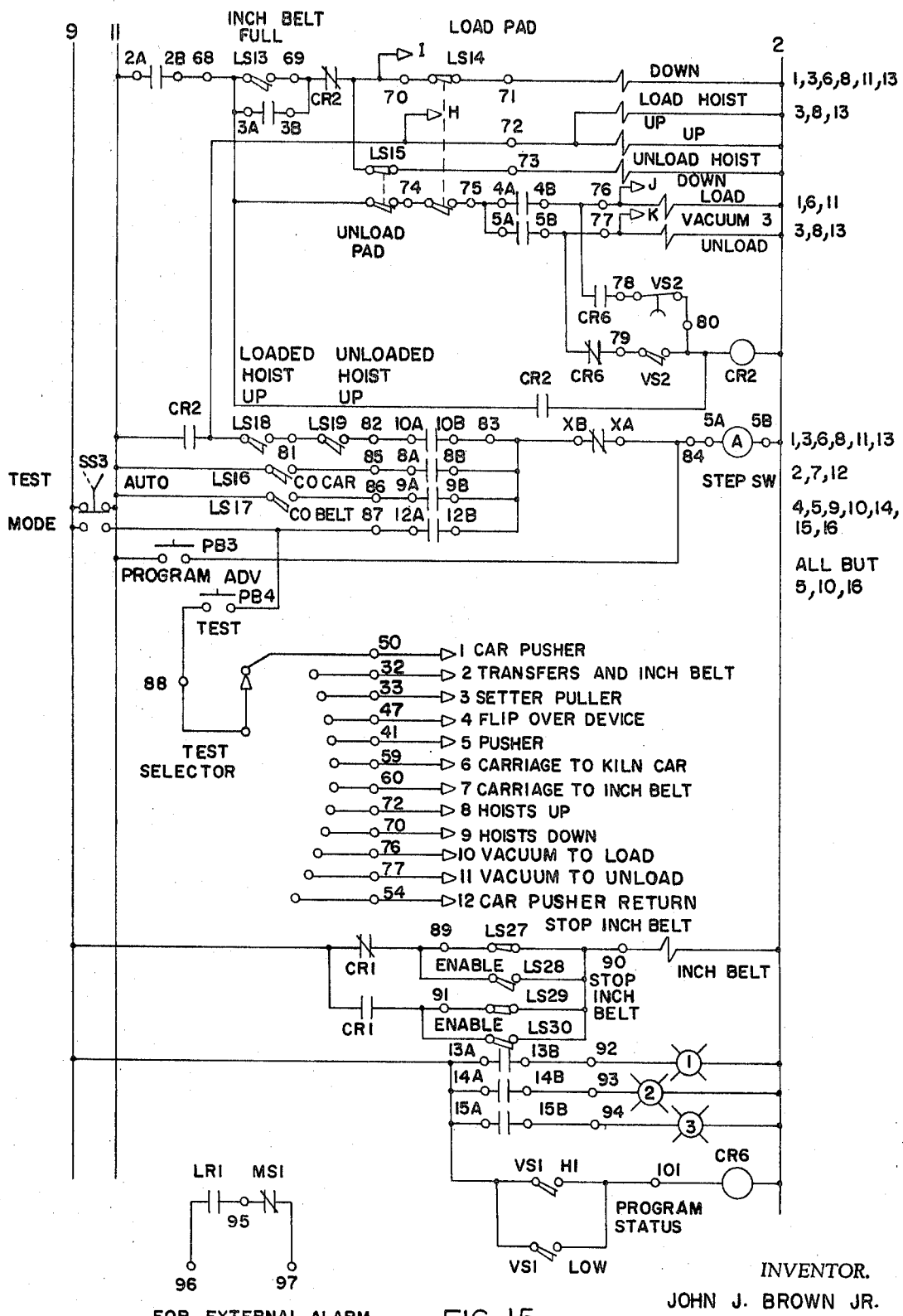

7 is an enlarged perspective view with parts broken away of the setter pusher/flipover device;

FIG. 8 is a plan view of the setter pusher/flipover device shown in FIG. 7 including a portion of the V-belt conveyor showing the gaps therein for unloading the tiles from the setters;

FIG. 9 is an elevation view of the setter pusher/flipover device shown in FIG. 7;

FIG. 10 is an enlarged perspective of the empty setter puller/turner device;

FIG. 11 is a plan view of the empty setter puller/turner device shown in FIG. 10;

FIG. 12 is an elevation view of the empty setter puller/turner device shown in FIG. 10; and FIGS. 13—15 are schematic wiring diagrams of the electrical control system used in the arrangement of FIG. 1.

Referring now to the drawings, and particularly to FIG. 1, the preferred embodiment of the system includes a closed loop conveyor path comprising four conveyors 20, 22, 24, and 26 arranged in a rectangular pattern including a loading index conveyor or belt 20, an inching conveyor 22, an unloading index belt 24, and a V-belt conveyor 26. The loading surface 28 of loading index belt 20 is positioned below the corresponding surfaces of conveyors 22, 24, and 26 for reasons to be hereinafter described.

Ceramic tile squares from the presses and spray booths are emptied into a pair of commercially available tile loading machines 30A and 31A positioned adjacent the loading index belt 20. The particular type or design of loading index belt 20 is determined by the type of loading machines 30A and 31A which are in use. Although the conveyor 20 described herein is adapted to properly function with one type of loader, the system is flexible so as to merely require a slight modification to loading conveyor 20 to adapt the system to a different type of loader.

Setters 30 and 31 are alternately positioned on loading index belt 20 and proceed along the belt until in a loading position where setter 30 is opposite loading machine 30A and setter 31 is opposite loading machine 31A. Each setter comprises a series of vertically spaced, horizontal slots arranged within a rectangular frame, and each slot is sequentially filled with a green tile by the tile-loading machines 30A and 31A in preparation for curing or firing in a kiln. The loaded setters or saggers 30 and 31 then proceed down loading index belt 20 to the end thereof adjacent the entrance end of inching conveyor 22.

A transfer device 34 then lifts a pair of setters 30 and 31 and transfers them onto the surface 32 of conveyor 22. A series of photoelectric eyes or cells PE1 through PE8 are mounted adjacent the entrance end of inching conveyor 22 and are selected in sequence by a Step Switch B to stop setters 30 and 31 at positions which form a course or layer. The setters advance one position at a time along the surface 32 of inching conveyor 22, and upon the filling of the course or layer, the load/unload transfer carriage 100 is activated to descend and grasp the setters by means of a series of vacuum cups, elevating the setters slightly above the level of inching conveyor 22. Load/unload transfer device 100 will be more specifically described hereinafter, however the course of setters is then transferred laterally to a position above an empty kiln car 36 positioned adjacent the entrance end of conveyor 22. The transfer carriage 100 descends and deposits a first layer of setters on the surface of kiln car 36 and returns to its "home" or waiting position above the surface 32 of inching conveyor 22. The cycle is then repeated until the kiln car is loaded to a prescribed number of levels, whereupon kiln car 36 is dispatched to the kiln (not shown).

While the first pickup head 102 of transfer carriage 100 is loading kiln car 36, a second pickup head 104 at the opposite end of transfer carriage 100 is simultaneously unloading a kiln car 38 containing setters with fired tiles, which has just returned from the kiln. Therefore, as the transfer carriage 100 returns from depositing a load of setters on kiln car 36, it carries therewith a load of setters from kiln car 38 to be deposited on the exit end of inching conveyor 22. It is therefore apparent that transfer carriage 100 carries a load of setters during each lateral movement of the cycle, therefore eliminating wasted motion.

The setters 30 and 31 proceed to the end of the inching conveyor where they are removed by a transfer device 40, similar to the transfer device 34 positioned at the other end of inching conveyor 22, and placed on the unloading index belt 24 in an upright position. Transfers 34 and 40 are actually operated from the same source of vacuum and controlled by the same latch relays LR3 and LR6, and limit switches LS4 and LS5 to insure that their transfers are made simultaneously. Unloading index belt 24 extends perpendicular to inching conveyor 22 forming the third side of the closed loop system, therefore the setters move away from the inching conveyor 22 at right angles thereto.

The setters proceed along unloading index belt 24 to the other end thereof, where a pair of setters 30 and 31 stop at a point adjacent the setter pusher 200. A hydraulic cylinder 204 having the piston 206 thereof connected to pusher plate 202 is then activated by relay LR5, whereupon the hydraulic cylinder 204 moves pusher plate 202 against the setters pushing them over onto the horizontal platform 302 of a flipover device 300. It should be pointed out here that the cylinders described herein are specified as being preferably hydraulic, however pneumatic cylinders would also perform the function satisfactorily.

The flipover device 300 includes basically a horizontally disposed platform 302 with a set of vertically disposed finger elements 304 extending vertically from the side thereof opposite pusher plate 202, the assembly being pivoted about a horizontal axis adjacent the common edge between platform 302 and fingers 304. A second hydraulic cylinder 314 is operatively connected to the lower surface of platform 302, and, when setters 30 and 31 are moved onto the platform, tilts the platform 90° so that the setters are turned over to a horizontal position on a V-belt conveyor assembly 26.

Conveyor 26 forms the fourth side of the system and is constructed differently than the other three conveyors in that gaps 42 and 44 are formed transversely across the surface of the conveyor belt, so that when setters 30 pass thereover in a horizontal position, the individual tiles drop by gravity from the slots in setters 30 and 31 through gaps 42 and 44, thus emptying the setters. The setters continue along V-belt conveyor 26 past a cleaning station 46 where the dust and lint is blown away by air hoses.

As the setters approach the end of V-belt conveyor 26 they engage a series of horizontally extending vacuum cups 402 forming part of setter turner 400. The suction is applied and the setters are pulled onto a hinged pan 404, which then lowers the setters through a 90° arc and deposits them in an upright position on the loading index belt 20. The suction is released and the setters 30 and 31 move perpendicularly away from conveyor 26 on conveyor 20 to be reloaded, and the setter turner 400 returns to its normal position.

The setters have thus completed their trip around the entire closed loop system and are ready to be reloaded. The individual subcombinations of the load/unload transfer carriage 100, the setter pusher 200, the flipover device 300, the transfer device 400, and the electrical circuit which controls the system will be more thoroughly discussed below.

LOAD/UNLOAD TRANSFER CARRIAGE

Turning now to FIGS. 2—6, the load/unload transfer carriage 100 comprises a framework 102 overlying the major portion of inching conveyor 22 and the adjacent loading positions of kiln cars 36 and 38. The framework 102 includes vertical support beams 104, 106, 108, 110, 112, and 114 supporting an upper, horizontally disposed, rectangular frame 116 which in turn comprises generally front member 118, rear channel 122, and side channels 120 and 124 fastened together and secured to the six vertical supports. Intermediate channel 126 extends between front channel 118 and rear channel 122 parallel to and approximately midway between the side channels 120 and 124.

A transversely reciprocal carriage 128 includes wheels 130 which are supported on the lower flanges of channels 120, 124 and 126 and adapted to roll back and forth in a front-to-rear direction. Carriage 128 supports and transversely reciprocates pickup heads 102 and 104 between a position above kiln car 36 and inching conveyor 32 and is operated by a double acting hydraulic cylinder 129, having the piston thereof attached to frame 116 and the housing thereof attached to carriage 128 (see FIG. 6).

More specifically, carriage 128 comprises a central support beam 132 to which hydraulic cylinder 134 is attached with the housing 136 of cylinder 134 extending above support beam 132 and the operating piston 138 extending through an opening 140 in central beam 132.

Pickup head 102 is suspended from the lower end of the hydraulic piston 138 which operates to reciprocate pickup head 102 in a vertical path to lift and lower the courses of setters. Support beam 132 further includes a pair of openings 142, one on either side of opening 140 through which support rods 144 and 146 are slidably received. The lower end of support rods 144 and 146 are connected to the framework of pickup head 102, and operate to prevent skewing of the pickup head during transfer.

Pickup head 102 itself comprises a rectangular horizontal framework 148 attached to piston 138 and supporting a series of vacuum cups 150 which engage setters 30 and 31 when pickup head 102 is lowered. A length of flexible tubing 152 connects each vacuum cup 150 with one of several vacuum conduits 154 supported by rectangular framework 148. A longer section of flexible tubing connects each vacuum conduit 154 with a source of suction 156 which in turn comprises essentially a motor 160 driving a centrifugal pump 162. A portion of rectangular frame 116, for example front member 116 is actually a hollow, longitudinal member sealed from the atmosphere and connected into the vacuum system to provide a vacuum reservoir in case of a power failure or if the source of vacuum fails. This insures that the course of setters being held at the time will not fall causing damage to the setters.

Pickup head 104 is identical to 102 as far as the mechanical parts are concerned, and therefore the same element numbers will be used to represent the details corresponding to pickup head 102. The distinguishing feature between pickup head 104 and 102 is that the pneumatic cycle of pickup head 104 is the reverse of pickup head 102, so that when the vacuum is applied to the vacuum cups 150 of pickup head 102 the vacuum is released from the suction cups of pickup head 104 and vice versa.

In operation, a kiln car 38 returns from the kiln loaded with several courses of setters containing fired tiles and is positioned adjacent inching conveyor 22 beneath pickup head 104. An empty kiln car 36 is similarly positioned adjacent the other or head end of inching conveyor 22 beneath pickup head 102. After a complete course of setters is loaded onto the initial end of inching conveyor 22, pickup carriage 100 is activated by limit switch LS13. The pickup carriage 100 then descends until vacuum cups 150 of pickup head 102 engage the top wall of setters 30 and 31, whereupon the vacuum is applied to grasp the setters, and the pickup head is elevated. During this operation the pickup head 104 contains the last or lower course of setters from the previous kiln car 38, and the vacuum is released to deposit them on inching conveyor 22 at the same time the vacuum to pickup head 102 is applied.

When a course of setters has been lifted and the pickup head 102 reaches its upper extent, carriage 128 is activated by the advance of step switch A to traverse to a position where pickup head 102 is above empty kiln car 36. Pickup head 102 is then activated by a further advance of step switch A to descend whereupon the vacuum is released to deposit the course of setters onto kiln car 36, while pickup head 104 engages the top course of setters from loaded kiln car 38 and the vacuum applied thereto. Pickup heads 102 and 104, through further advances of step switch A, are then elevated to their uppermost position and traverse back to a position overlying inching conveyor 22. When another course of setters is formed on the surface 32 of inching conveyor 22, the cycle is repeated, and after every third cycle a new loaded kiln car is moved into position beneath pickup head 104 by a standard under-car pusher device 37 and kiln car 36 which has become loaded is moved out and into the kiln for firing.

SETTER PUSHER/FLIPOVER DEVICE

The setter pusher 200 and flipover device 300 at the intersection or unloading index belt 24 and V-belt conveyor 26, illustrated in FIGS. 7—9, comprise generally a hydraulically operated ram plate 202 which reciprocates transversely across unloading index belt 24 for pushing a pair of setters 30 and 31 from the end of belt 24 onto a platform 302 of the flipover device 300. The flipover device then rotates setters 30 and 31 onto their sides in a facedown arrangement atop V-belt conveyor 26 which carries the setters away and unloads them.

More specifically, setter pusher 200 comprises an upstanding support 210, having the lower end thereof resting on the floor adjacent to the terminal end of unloading index belt 24. A second upstanding support 214 is attached to one of the support sides of unloading index belt 24 and combines with support 210 to provide a means for supporting a mounting frame 218. Double-acting hydraulic cylinder 204 is horizontally mounted atop frame 218 and includes a piston 206 with ram plate 202 attached to the terminal end thereof. The setter-engaging surface of ram plate 202 extends parallel with the direction in which unloading index belt 24 is moving and the operation of cylinder 204 pushes the plate 202 transversely across belt 24 moving setters 30 and 31 positioned thereon over onto the flipover device 300.

Flipover device 300 comprises a support channel 310 suspended from support beam 25 of unloading index belt 24 and connected at the lower end thereof to support member 210 by means of connecting bar 312. A lug 316 extends horizontally from the lower end of support channel 310 and hydraulic cylinder 314 including reciprocal piston 318 is pivotally attached thereto. An L-shaped setter bracket 320 comprises a normally horizontal platform 302 extending transversely across the path of setters 30 and 31 and a series of normally upstanding finger elements 304 attached to one transverse edge of support plate 302 which substantially fills the gap between the end of V-belt conveyor 26 and unloading index belt 24. Support bracket 320 is mounted for rotation about a transverse pin 322 suitably journaled to the framework of V-belt conveyor 26, adjacent the intersection between horizontal platform 302 and vertical fingers 304. A lug 324 protrudes beneath horizontal support plate 302 and is pivotally connected to the terminal end of piston 318.

So constructed, the setter pusher assembly 200 and the flipover device 300 operate in the following manner. When a pair of setters 30 and 31 reach the terminal end of unloading index conveyor 24, and the entire system is ready to progress one step, hydraulic cylinder 204 is activated by latching relay LR5. This causes piston 206 to urge ram plate 202 transversely across the end of unloading index conveyor 24 carrying ahead of it setters 30 and 31 over onto the horizontal support platform 302 of flipover device 300. Return of piston 206 to its normal position engages a limit switch LS11 which activates hydraulic cylinder 134 causing piston 318 to move upwardly, which in turn urges support bracket 320 to rotate 90°. Fingers 304 are of such size that they fall between the belts forming V-belt conveyor 26, and upon the arcuate movement mentioned above, lay setters 30 and 31 down upon their sides on the V-belt conveyor 26. Setters 30 and 31 then proceed along V-belt assembly 26, and the piston 318 of hydraulic cylinder 314 is reversed bringing the support platform 320 back up to the upright or "home" position.

V-belt conveyor 26 further includes transverse slots or gaps 42 and 44 across a portion of the belt, allowing the tiles to fall by gravity from setters 30 and 31 as they pass across the slots. The V-belt conveyor 26 is just one example of several conveyors that could satisfactorily be used. Another example includes two separate conveyors, one of which initially receives the setters from flipover device 300 and moves slowly to insure emptying of the setters 30 and 31. The second conveyor would carry the empty setters toward the empty setter puller/turner 400 considerably faster.

Setter cleaner 46 comprises merely one or more air hoses which blow compressed air through the setters, thus cleaning the dirt and lint from them in preparation for reloading.

EMPTY SETTER TURNER

As the setters 30 and 31 arrive at the end of the belt conveyor 26 illustrated in FIGS. 10—12, the movement of the conveyor urges each setter into engagement with a pair of horizontally arranged vacuum cups 402. Each vacuum cup 402 is attached to one end of a horizontal tubular support rod designated as 406, 408, 410, and 412, and the vacuum applied to the other end thereof. A length of tubing 422 extends from suction box 424 through support rod 406 to the vacuum cup at the other end. A branch tube 426 likewise extends through support rod 408. The other pair of pull rods 410 and 412 receive branch tube 428 and tube 432 respectively, tube 432 being connected to suction box 434 which in turn is connected to source of suction 436.

Horizontally reciprocal angle 404 and stationary angle 405 retain the pull rods 406, 408, 410 and 412 in laterally spaced arrangement and are normally longitudinally spaced from each other, with the piston 401 of double acting hydraulic cylinder 403 being attached to the vertical flange of angle 404 and the housing 413 of the cylinder secured to angle 405. As the hydraulic cylinder 403 is activated to retract piston 401, angle 404 and setters 30 and 31 are pulled toward angle 405 until the setters are positioned over pan 438. Then as the fluid in cylinder 403 is reversed after releasing setters 30 and 31, vacuum cups 402 return to their normal position. Other flexible tubing 415 and 417 connect a source of suction 419 with each end of hydraulic cylinder 403.

One transverse edge of hinged pan 438 is journaled between side rails 440 and 442 of conveyor 26 in line with and immediately adjacent to the end of V-belt conveyor 26. Pan 438 is thus arranged for rotational movement between a horizontal position underlying setters 30 and 31 and a vertical position extending downwardly toward loading conveyor 20.

A lug 444 extends downwardly from the under surface of pan 438 to which the free end of the piston 448 of double acting hydraulic cylinder 446 is pivotally attached. A bracket 450 extends downwardly from the conveyor framework to pivotally attach the main housing of hydraulic cylinder 446 thereto. Another length of flexible tubing 452 connects the hydraulic cylinder 446 with a pump 447.

In operation, a pair of setters 30 and 31 proceed to the end of V-belt conveyor 26, whereupon they engage one or more vacuum cups 402. Actuation of LS1 signals the entire control system to advance one step whereupon latch relay LR4 activates the empty setter puller/turner and applies suction from source 436 through pull rods 406, 408, 410, and 412 thus grasping the setters. Hydraulic cylinder 403 is also energized to pull setters 30 and 31 onto the surface of pan 438.

The hydraulic cylinder 446 is then activated by engagement of the setters with limit switch LS31 which lowers the pan 438 to a vertical position, whereupon the setters are held some distance above the loading index conveyor 20. The hydraulic cylinder 403 is then reversed, lowering setters 30 and 31 to a point immediately above the loading index conveyor 20. The vacuum to vacuum cups 402 are then released, the setters drop onto the surface of loading conveyor 20, and the pan 438 is returned to its normal position. When another pair of setters 30 and 31 engage the vacuum cups, the cycle is ready to be repeated.

ELECTRICAL OPERATION

The present system is electrically controlled and hydraulically powered, the electrical controls comprising generally a system whereby a series of switches indicate or prove when each apparatus is ready to proceed to the next step. At such a time as all proofs are met, the system automatically activates each station to advance the entire machine one step.

In the test operation, the operator can manually actuate each apparatus separately, however this is merely for purposes of test and setup and will not be further discussed.

In the automatic operation, the machine is controlled by a pair of programmer step switches, latch relays, control relays, limit switches, and pressure switches. Limit switch LS1 is located at the end of the loading index belt 20 which receives the filled setters 30 and 31 is operated by the filled setters as they index forward. Limit switch LS1 is the primary control limit switch that signals the entire system move forward one position. Proofs LS2, LS6, LS25, LS20, LS12, control relay CR6, LS13, LS32, CR2 and step switch A must indicate all functions have completed their previous operation and are at rest before the operation of limit switch LS1 can advance the entire system. If the proofs are met, the operation of limit switch LS1 energizes time delay relay TDR1 which in turn activates control relay CR4, whereupon the entire system is activated to advance one step.

A series of photoelectric eyes, PE1—PE8, are mounted along the inching conveyor to stop the setters being marshaled onto the inch belt at the proper point during each step. The photoelectric eyes are selected in sequence by a step switch B which controls the marshaling onto and off of the inch belt. When the inching conveyor 22 becomes filled with setters 30 and 31, limit switch LS13 signals the pickup head 102 to remove the setters from the inching conveyor and place them on kiln car 36.

Simultaneously, when limit switch LS1 operates time delay relay TDR1 and control relay CR4, then latch relay LR3 activates transfers 34 and 40 to lower them into engagement with a pair of setters for transfer. When limit switch LS4 indicates that the transfers 34 and 40 are in engagement with a pair of setters, the transfer vacuum is turned on by latch relay LR6 and the vacuum cups are brought into contact with the setters by a further position of limit switch LS4. When the vacuum pads of transfer devices 34 and 40 have engaged the setters, and the vacuum has been proven by vacuum switch VS4, the transfer devices 34 and 40 are activated to turn upward-lifting setters 30 and 31. Limit switch LS5 proves that the transfer devices 34 and 40 have completed their upturn and operates a control relay CR3, thus releasing latching relay LR6 and lowering the transfer devices 34 and 40 to a position above one end of inching conveyor 22 and one end of unloading index belt 24 respectively. Latch relay LR6 is then unlatched by control relay CR3, the vacuum released, and the transfer devices returned to their normal position.

At rest, the transfer carriage 128 is normally positioned over the inching conveyor 22, with pickup head 102 empty and pickup head 104 full. At this time step switch A is in position 1. Limit switch LS13 is engaged and operated when the inching conveyor 22 fills with green tile, activating both pickup heads 102 and 104 to bring them down to a position immediately above the surface 32 of inching conveyor 22. Limit switches LS14 and LS15 are engaged by the downward movement of pickup heads 102 and 104 respectively, and when both limit switches have been engaged, the vacuum valve VS3 shifts releasing the load of setters from pickup head 104 and placing vacuum on the vacuum heads 150 of pickup head 102. Control relay CR2 then activates both pickup heads 102 and 104 to lift them, whereupon limit switches LS18 and LS19 are engaged, advancing step switch A to position 2, which energizes a traverse valve activating hydraulic cylinder 129. Carriage 128 is then moved to a position over the kiln cars 36 and 38, whereupon a limit switch LS16 is engaged advancing the step switch to position 3. Pickup heads 102 and 104 are then lowered until limit switches LS14 and LS15 are engaged by pickup heads 102 and 104 respectively, whereupon the downward movement of the pickup heads is terminated. Vacuum switch 2 connected with pickup head 104 then closes, gripping a course of setters from kiln car 38, and simultaneously vacuum switch VS1 releases the vacuum to pickup head 102 dropping a course of setters onto kiln car 36. The pickup heads 102 and 104 are then activated by control relay CR2, and lifted until limit switches LS18 and LS19 are engaged, proving the hoists are up and advancing step switch A to position 4. Control relay CR2 then releases as the step switch advances, whereupon the traverse valve is energized to return carriage 128 to a position atop the inching conveyor 22, and limit switch LS17 is engaged, moving the step switch A to position 5. Pickup heads 102 and 104 then await a signal from limit switch LS13 which begins the cycle again. The transporting of the second course of setters occurs on steps 5, 6, 7, and 8 of step switch A, and on position 9 the pickup heads 102 and 104 are waiting for the third course. The transporting of the third course occurs on positions 9—12 of step switch A, whereupon shifting of the kiln cars occurs. After the kiln cars are moved and the proofs satisfied, step switch A resets to position 1 where the cycle begins again.

Upon completion of the loading of three courses of setters onto kiln car 36 and the simultaneous unloading of three courses of setters from kiln car 38, step switch B signals the kiln car pusher 37 to index the cars forward by energizing latch relay LR2. While latch relay LR2 is energized, the loading and unloading program of the cars cannot proceed until the cars are completely positioned. Upon a signal from latch relay LR2, the kiln car pusher 37 moves forward until it reaches limit switch LS21, whereupon latch relay LR2 is released, and the car pusher returned to its normal position-engaging limit switch LS24. Limit switches LS22 and LS23 are the proofs that the kiln cars are in position for another cycle of loading and unloading of the kiln cars.

Operation of limit switch LS1, time delay relay TDR1 and control relay CR4 also activate latch relay LR5, which energizes the double-acting hydraulic cylinder 204 to urge ram plate 202 across the end of unloading index belt 24, shifting a pair of setters 30 and 31 laterally onto the flipover device 400. Movement of ram plate 202 engages limit switch LS10 at the end of the stroke, releasing latch relay LR5, which reverses hydraulic cylinder 204 to return ram plate 202 to its normal position. As setters 30 and 31 are pushed onto flipover device 300, a limit switch LS11 is engaged which operates to activate hydraulic cylinder 314, pushing the flipover device over to its second position, whereupon the setters are resting on their sides on V-belt conveyor 26. As soon as the V-belt moves enough to carry setters 30 and 31 clear of the flipover device, limit switch LS11 and LS33 release, bringing the flipover device back to its normal position, operating proof switch LS25. The unloading index belt 24 then proceeds until another pair of setters engage limit switch LS20, signalling that the setters are in place on the unloading index belt 24.

Operation of limit switch LS1, time delay relay TDR1, and control relay CR4 also energize latch relay LR4, which activates the empty setter puller/turner device 400. Latch relay LR4 activates the system to apply suction to vacuum heads 402. Setters 30 and 31 are then pressed against the vacuum pads 402 and the setter puller is activated, pulling the setters onto the surface of hinged pan 438. The movement of setters 30 and 31 engages a limit switch LS31 which in turn activates hydraulic cylinder 446 to lower pan 438 to its vertical position, whereupon the setters are held in an upright position above loading index conveyor 20. Rotational movement of pan 438 engages a limit switch LS7 which in turn releases latch relay LR4, extending the piston of cylinder 403 positioning the setters immediately above the surface of conveyor 20 as well as releasing the vacuum and allowing the setters to drop onto the surface of the conveyor 20. The loss of vacuum then enables vacuum switch VS3 to return the empty turner to its normal position engaging limit switch LS6 which is proof that the empty setter puller/turner is ready to repeat its cycle.

SUMMARY

From the foregoing description it will be seen that the present invention provides an apparatus for easily and efficiently continuously processing green, uncured ceramic tiles during the curing process thereof. The facility of the operation is achieved through the handling of the tiles in setters, and the processing of the setters through a fully automated apparatus whereby the setters are loaded, transferred to a kiln car for curing, unloaded from a kiln car after curing and returned to the closed loop system, automatically emptied, cleaned, and returned to an upright position for reloading. The apparatus is electrically controlled and hydraulically powered, the setters being processed step-by-step around the machine, the initiation of each step being held until all of the devices in the apparatus have completed the previous step. In the load/unload transfer area, a complete course of setters is transferred from the conveyor over to an empty kiln car, and simultaneously a course of setters which contain tiles that have been cured is transferred from a returning car back to the conveyor, whereby the setters are returned into the closed loop system. In another device of the system, the setters are automatically turned over onto the sides, whereupon the tiles are removed by gravity, and still a further device returns the setters to an upright position whereby they may be loaded.

While the invention has been described in detail with respect to certain preferred embodiments, it will be understood by those skilled in the art, after understanding the invention, that various changes and modifications may be made without departing from the spirit and scope of the invention, and it is intended therefore, to cover all such changes and modifications in the appended claims.

I claim:

1. A closed loop system for automatically handling open-side setters filled with green ceramic tiles, loading them onto kiln cars for curing, unloading the setters from said cars upon their return from the kiln, emptying and cleaning the setters, and returning them to be reloaded with tiles, said system comprising:
   a. a closed loop conveyor system including a first loading conveyor, a second inching conveyor, a third unloading conveyor, and a fourth emptying conveyor;
   b. a loading machine along said first conveyor adapted to fill a first group of said setters with green ceramic tiles in preparation for delivery to said second conveyor and subsequent curing in a kiln;
   c. a first transfer means to transfer said first group of setters from said first conveyor to said second conveyor;
   d. a load/unload transfer means along said second conveyor for loading said first group of setters from said second conveyor onto one kiln car and unloading a second group of setters from a second kiln car onto said second conveyor for delivery to said third conveyor;
   e. a second transfer means to transfer said second group of setters from said second conveyor to said third conveyor;
   f. tilting means positioned at the intersection of said third unloading conveyor and said fourth emptying conveyor for shifting said second group of setters onto said emptying conveyor and rotating said second group of setters about a horizontal axis to discharge their tiles;
   g. means for removing said discharged tiles from said fourth conveyor; and
   h. resetting means positioned at the intersection of said fourth emptying conveyor and said first loading conveyor for returning said setters to an upright position on said first conveyor.

2. The closed loop system according to claim 1 wherein said load/unload transfer means comprises a carriage mounted for reciprocal movement between a first position overlying said second inching conveyor and a second position overlying kiln cars positioned adjacent said first conveyor means, a first and second pickup head mounted to said carriage at opposite ends thereof, each of said pickup heads being vertically reciprocal and including a means for gripping and releasing a course of setters, said first pickup heads gripping a course of setters as the second pickup head releases a course of setters and said second pickup head gripping a course of setters as said first pickup head releases, whereby said first pickup head carries a course of setters from said inching conveyor onto an empty kiln car, and on the return trip said second pickup head carries a course of setters from a loaded kiln car onto said second conveyor means.

3. The closed loop system according to claim 2 wherein said transfer carriage is activated in response to the forming of a complete course of setters on the entrance end of said second inching conveyor beneath said first pickup head.

4. The closed loop system according to claim 2 wherein each of said pickup heads further comprise a plurality of suction cups adapted to engage said setters, each suction cup being connected to a source of suction, there being at least one suction cup per setter.

5. The closed loop system according to claim 1 wherein said first and second transfer means comprises a series of vacuum cups mounted on a horizontal arm, said horizontal arm being pivotal around a horizontal axis extending transversely of said second inching conveyor, said vacuum cups being connected to a source of suction whereby when said cups engage the upper wall of said setters, said setters may be lifted from one of said conveyors to another adjacent conveyor.

6. The closed loop system according to claim 1 wherein said tilting means comprises a ram plate and a flipover device, said ram plate being reciprocal between a position on one side of said third unloading conveyor and a second position on the other side of said conveyor adjacent said flipover device, comprising a normally horizontal support plate onto which said setters are shifted by said ram plate, said support plate being rotatable between a first horizontal position and a second position arcuately spaced 90° from said first position, whereby said ram plate pushes a pair of setters from said second conveying means onto the support plate of said flipover device and said flipover device turns said setters 90° from an upright position to a position where said setters are horizontally disposed.

7. The closed loop system according to claim 6 wherein said ram plate is connected to the piston of a hydraulic cylinder for operating said plate between said first and second position.

8. The closed loop system according to claim 6 wherein said flipover device comprises a series of fingers normally disposed perpendicular to said support plate to provide support during the tilting of said setters, said support plate being attached to a hydraulic cylinder and operated thereby.

9. The closed loop system according to claim 1 wherein said means for removing said discharged tiles from said fourth emptying conveyor includes at least one gap therein through which the tiles in said setters drop by gravity as the setters proceed along said conveyor.

10. The closed loop system according to claim 1 wherein said fourth emptying conveyor further includes a cleaning means, whereby said setters are cleaned in preparation for reloading.

11. The closed loop system according to claim 1 wherein said resetting means comprises a series of vacuum cups horizontally arranged in the plane of said emptying conveyor and against which the incoming setters are urged, said vacuum cups being connected to a source of suction and being activated in response to engagement of said vacuum cups with the upper wall of said setters, means for rotating said vacuum cups to a vertical position, whereby said setters are moved from a horizontal position on said fourth emptying conveyor to an upright position on said first loading conveyor.

12. The closed loop system according to claim 11 wherein said means for rotating said vacuum cups to a vertical position comprises a double-acting hydraulic cylinder.

13. The closed loop conveyor according to claim 11 wherein said vacuum cups are horizontally reciprocal between a normally extended position and a retracted position, a hinged pan underlying said vacuum cups in said retracted position, said pan providing support for said setters during the pivotal movement of the setters to an upright position.

14. The closed loop system according to claim 11 wherein said first loading conveyor is vertically spaced below the level of said second and fourth conveyors.

15. The closed loop system according to claim 14 wherein the space between said first conveyor belt and said other conveyor means is greater than the height of a setter.